United States Patent

Cross et al.

[11] 4,373,771
[45] Feb. 15, 1983

[54] LAMP SOCKET

[75] Inventors: William E. Cross, Brookfield; Robert G. Plyler, Vienna, both of Ohio

[73] Assignee: General Motors Corporation, Detroit, Mich.

[21] Appl. No.: 205,718

[22] Filed: Nov. 10, 1980

[51] Int. Cl.³ .............................................. H02B 1/02
[52] U.S. Cl. .......................... 339/125 L; 339/17 D; 339/127 R; 339/128; 339/176 L
[58] Field of Search ............ 339/17 D, 127 R, 125 L, 339/128, 176 L, 188 R

[56] References Cited

U.S. PATENT DOCUMENTS

| | | | |
|---|---|---|---|
| 3,017,599 | 1/1962 | Loesch | 339/91 |
| 3,324,442 | 6/1967 | Greasley | 339/127 R X |
| 3,473,015 | 10/1969 | Haas et al. | 339/127 R X |
| 3,614,713 | 10/1971 | Heath | 339/128 |
| 3,912,355 | 10/1975 | Curado et al. | 339/128 |
| 4,005,924 | 2/1977 | Nestor | 339/17 D |
| 4,029,953 | 6/1977 | Natoli | 339/127 R X |

*Primary Examiner*—Willie G. Abercrombie
*Attorney, Agent, or Firm*—Edward J. Biskup

[57] ABSTRACT

A lamp socket that is insertable into a generally circular opening in a mounting panel and having a pair of radially outwardly extending access slots for portions of the lamp socket, characterized in that the lamp socket includes a flexible locking tab that moves into one of the access slots to lock the lamp socket to the mounting panel after the lamp socket is rotated a limited distance about the longitudinal center axis of the lamp socket.

1 Claim, 6 Drawing Figures

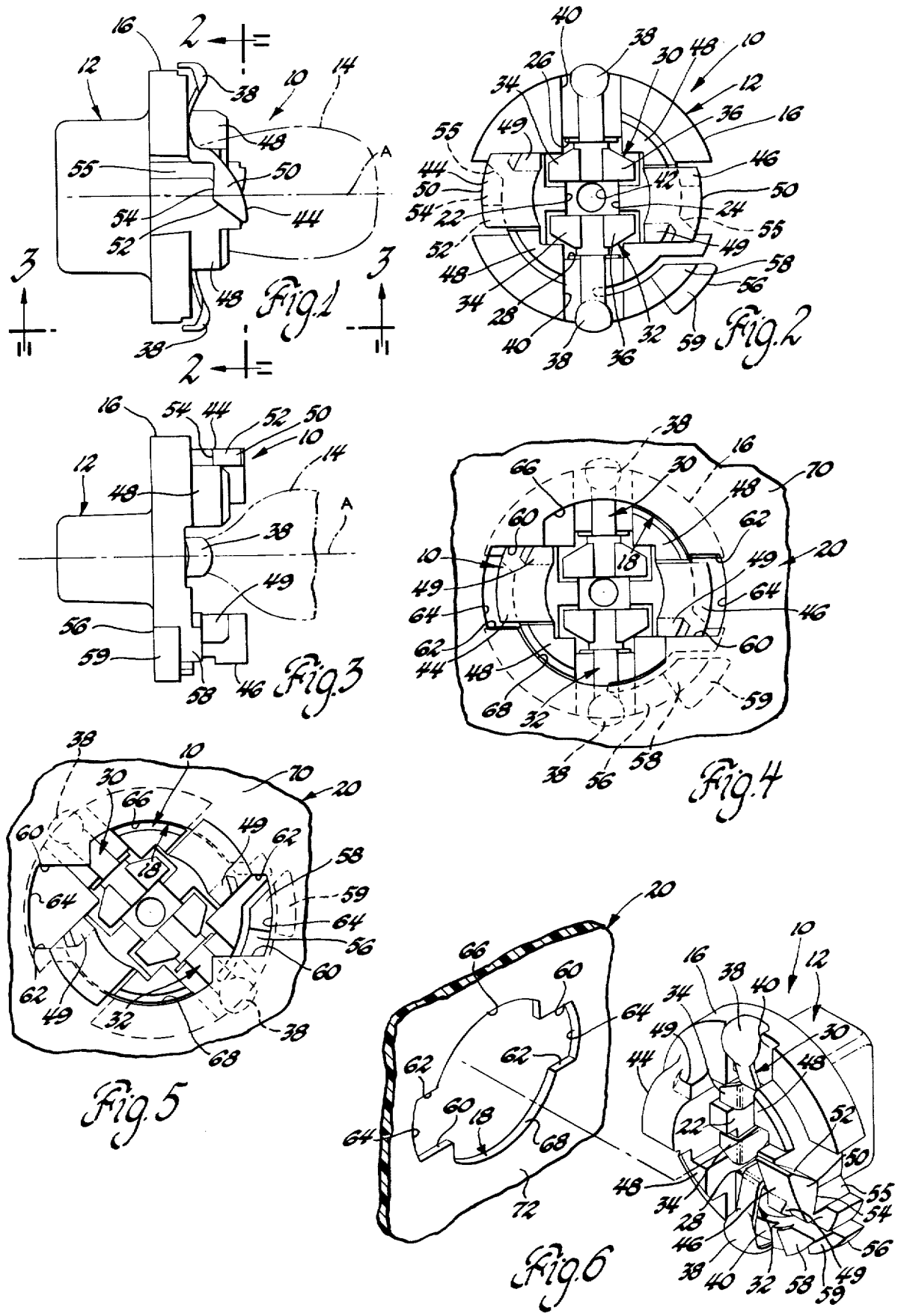

LAMP SOCKET

This invention relates to lamp sockets in general and, more particularly, concerns a lamp socket adapted to be inserted into a socket opening formed in a mounting panel and to be locked thereto after a slight rotation of the lamp socket.

More specifically, the lamp socket according to the present invention is adapted to be retained within a generally circular socket opening in a mounting panel that is formed with a pair of radially outwardly extending access slots. The lamp socket has a body portion integrally formed with a collar having an outer diameter larger than the inner diameter of the socket opening. The body portion has an axial bore formed therein for receiving a light bulb and has the collar thereof formed with a pair of retainer members which include ramp portions and which project outwardly from the collar and are adapted to be inserted into the pair of access slots. A cantilevered beam is formed integrally with the collar in the plane thereof and has a locking tab projecting axially therefrom adjacent one of the retainer members so that insertion of one of the retainer members into one of the accommodating access slots—followed by rotation of the body portion, causes the ramp portions to engage a surface of the mounting panel and to position such surface between the ramp portion and the collar to thereby hold the lamp socket to the mounting panel while simultaneously causing the cantilevered beam—and accordingly the locking tab, to initially flex about an axis transverse to the longitudinal axis of the lamp socket, and then move into one of the access slots to lock the lamp socket to the mounting panel.

The objects of the present invention are: to provide a new and improved lamp socket that is insertable into an opening in a mounting panel and has a locking tab which moves into the opening to lock the lamp socket to the mounting panel after the lamp socket is slightly rotated about its longitudinal axis; to provide a new and improved lamp socket having a body portion formed with a collar that carries a cantilevered locking tab which flexes about an axis transverse to the longitudinal axis of the body portion during insertion of the lamp socket into a socket opening in a mounting panel and thereafter moves into the socket opening to lock the lamp socket to the mounting panel; and to provide a new and improved lamp socket that is insertable into a generally circular socket opening in a mounting panel that has a pair of radially extending access slots for portions of the lamp socket and which include a flexible locking tab that moves into one of the access slots to lock the lamp socket to the mounting panel after the lamp socket is rotated a limited distance about the longitudinal axis of the lamp socket.

Other objects and advantages of the present invention will be apparent from the following description when taken in conjunction with the accompanying drawings, in which:

FIG. 1 is a side elevational view of a lamp socket made in accordance with the present invention;

FIG. 2 is a front elevational view of the lamp socket taken on lines 2—2 of FIG. 1;

FIG. 3 is a view of the lamp socket taken on lines 3—3 of FIG. 1;

FIG. 4 is a view similar to FIG. 2, with the lamp socket positioned within a socket opening formed in a mounting panel;

FIG. 5 is a view similar to FIG. 4, but shows the relative location of the various portions of the lamp socket and the socket opening after the lamp socket is rotated and locked in position on the mounting panel; and FIG. 6 is a perspective view of the socket opening in the mounting panel and the lamp socket shown in FIGS. 1 through 5.

Referring to the drawings and particularly to FIGS. 1, 2, 3 and 6 thereof, a lamp socket 10, made in accordance with the invention, is shown comprising a body portion 12, made of an insulating material such as plastic, that receives a conventional wedge-base type light bulb 14 through one end thereof. The body portion 12 is integrally formed with a collar 16 having an outer diameter larger than the inner diameter of a generally circular socket opening 18 formed in a mounting panel 20—such as frequently found on instrument panels of an automotive vehicle. The lamp socket 10 is adapted to be manually inserted into the socket opening 18 formed in the mounting panel 20 and, after a slight manual twist, the lamp socket 10 will lock in position and be retained in the mounting panel 20, as will be hereinafter more fully explained.

The body portion 12 of the lamp socket 10 has formed therein an axially directed opening which is generally rectangular in cross section and defined by a pair of side walls 22 and 24 and a pair of end walls 26 and 28. A pair of identical terminal members 30 and 32, made of electrically conductive material such as brass, are secured to the body portion 12 within the aforementioned opening formed therein. Each of the terminal members 30 and 32 includes a pair of spring fingers 34 and 36 integral with a contact member 38 that extends radially outwardly from the center of the body portion 12 and is located within a transverse slot 40 formed in the collar 16. The spring fingers 34 and 36 are adapted to engage and retain the base (not shown) of the light bulb 14 and provide an electrical connection between the terminals formed with the base of the light bulb 14 and each of the contact members 38 formed with the terminal members 30 and 32. In this regard, it will be noted that a circular aperture 42 is provided in the center of the body portion 12 for accommodating a pair of leads, which would be part of the conventional lighting harness associated with a vehicle (not shown).

The collar 16 is integrally formed with the body portion 12, as aforementioned, and is located in a plane which is perpendicular to the longitudinal center axis "A" of the lamp socket 10. In addition, the collar 16 is formed with a pair of identical retainer members 44 and 46 that project axially outwardly from the collar 16 (as seen in FIG. 1), and are located in diametrically opposed positions on collar 16. Each of the retainer members 44 and 46 is integrally formed with locator portions 48 and 49, and a ramp portion 50 which is defined by a pair of intersecting flat surfaces 52 and 54. The flat surface 54 connects with a surface 55 which serves as a stop or limiting means, as will hereinafter be explained. The collar 16 also is formed with a curved cantilevered beam 56, the free end of which has a locking tab 58 projecting axially outwardly therefrom along an axis that is parallel to the longitudinal center axis "A" of the lamp socket 10. As best seen in FIGS. 2 and 3, adjacent the locking tab 58, and spaced radially outwardly therefrom, is a tongue 59, integrally formed with the free end of the cantilevered beam 56, that can be manually grasped for releasing the locking tab 58, as will hereinafter be explained.

As seen in FIGS. 4 and 6, the socket opening 18 in the mounting panel 20 is formed with a pair of radially extending access slots, each of which is defined by a pair of substantially parallel side walls 60 and 62 and a curved end wall 64. The side wall 60 is slightly longer than side wall 62, and both are connected to curved walls 66 and 68 which define the main portion of the socket opening 18. The socket opening 18 is specially designed to receive the lamp socket 10 and, in this connection, it will be noted that the lamp socket 10 is manually inserted within the socket opening 18, with the retainer members 44 and 46 aligned with and located within the access slots, as seen in FIG. 4. In this inserted position of the lamp socket 10, an imaginary plane lying in the front surface 70 of the mounting panel 20 will intersect the flat surface 52 of each ramp portion of the retainer members 44 and 46, and the locking tab 58 will be in engagement with the rear surface 72 of the mounting panel 20. Concurrently, the respective locator portions 48 and 49 of the retainer members 44 and 46 will cooperate with the curved walls 66 and 68 and with the side walls 60 of the socket opening 18 for maintaining the retainer members 44 and 46 in proper position relative to the access slots. Afterwards, a push-in pressure is manually applied to the body portion 12 towards the rear surface 72 of the mounting panel 20 causing the cantilevered beam 56 to flex about an axis perpendicular to the longitudinal center axis "A" of the lamp socket 10. Simultaneously, the lamp socket 10 is rotated as a unit in a counterclockwise direction until the stop surface 55 engages side wall 62 of the associated access slot to prevent further rotation of the lamp socket 10. As seen in FIG. 4, rotational movement of the lamp socket 10 will cause the surface 54 of each of the ramp portions 50 to be in full contact with the front surface 70 of the mounting panel 20 so as to retain the lamp socket 10 thereon while, at the same time, the cantilevered beam 56 returns to the "relaxed" state as the locking tab 58 moves into the access slot (as seen in FIG. 5). The lamp socket 10 is thus locked to the mounting panel 20 and both axial and rotary movement thereof is prevented, with the contact member 38 of each of the terminal members 30 and 32 making electrical contact with a printed circuit (not shown) that can be formed on the rear surface 72 of the mounting panel 20.

It will be noted that in order to release the lamp socket 10 from the socket opening 18 in the mounting panel 20, it is merely necessary to manually grasp the tongue 59 formed with the cantilevered beam 56 and, by pulling on the tongue 59 in a direction parallel to the longitudinal center axis "A" of the lamp socket 10 and away from the rear surface 72 of the mounting panel 20, the locking tab 58 can be moved out of the access slot so that the lamp socket 10 can be rotated manually in a clockwise direction to the position of FIG. 4 and removed from the socket opening 18.

Various changes and modifications can be made in this construction without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. A lamp socket assembly adapted to be inserted into a socket opening formed in a mounting panel, said socket opening being generally circular in configuration and formed with a pair of diametrically opposed access slots; a lamp socket adapted to receive a light bulb and having a body portion integrally formed with a collar located in a plane which is perpendicular to the longitudinal center axis of said body portion, said collar having an outer diameter larger than the inner diameter of said socket opening; a pair of retainer members projecting outwardly from said collar and adapted to be inserted into said pair of access slots, each of said retainer members including a ramp portion; a curved cantilevered beam formed integrally with and extending directly from said collar and being located in said plane thereof, said cantilevered beam having a raised locking tab projecting outwardly from the free end of said cantilevered beam, said locking tab being located along an axis parallel to said longitudinal center axis of said body portion whereby insertion of said pair of retainer members into said pair of access slots followed by rotation of said lamp socket in one direction causes said ramp portion to engage a portion of said mounting panel for positioning said portion of said mounting panel between said ramp portion and said collar to thereby hold said lamp socket to said mounting panel from movement along said longitudinal center axis of said body portion while simultaneously causing said cantilevered beam to initially flex about an axis which is perpendicular to and extends towards said longitudinal center axis of said body portion and then move said locking tab into one of said access slots to limit rotational movement of said lamp socket relative to said mounting panel; and a tongue formed with said free end of said cantilevered beam for manually flexing said cantilevered beam about said perpendicular axis for removing said locking tab from said one of said access slots so that rotation of said lamp socket in a direction opposite to said one direction allows said lamp socket to be removed from said socket opening.

* * * * *